(12) United States Patent
Fujii et al.

(10) Patent No.: US 11,948,710 B2
(45) Date of Patent: Apr. 2, 2024

(54) NON-ORIENTED ELECTRICAL STEEL SHEET AND METHOD FOR PRODUCING SAME

(71) Applicant: NIPPON STEEL CORPORATION, Tokyo (JP)

(72) Inventors: Hiroyasu Fujii, Tokyo (JP); Jun Maki, Tokyo (JP); Kazutoshi Takeda, Tokyo (JP); Akira Akagi, Tokyo (JP); Yuya Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/271,622

(22) PCT Filed: Mar. 30, 2022

(86) PCT No.: PCT/JP2022/015953
§ 371 (c)(1),
(2) Date: Jul. 10, 2023

(87) PCT Pub. No.: WO2022/210871
PCT Pub. Date: Oct. 6, 2022

(65) Prior Publication Data
US 2023/0395291 A1 Dec. 7, 2023

(30) Foreign Application Priority Data
Mar. 30, 2021 (JP) .................. 2021-057776

(51) Int. Cl.
*H01F 1/147* (2006.01)
*B32B 15/04* (2006.01)
(Continued)

(52) U.S. Cl.
CPC .......... *H01F 1/147* (2013.01); *B32B 15/043* (2013.01); *B32B 15/18* (2013.01); *C23C 22/03* (2013.01);
(Continued)

(58) Field of Classification Search
CPC ....... H01F 1/147; B32B 15/043; B32B 15/18; B32B 2255/06; B32B 2255/26;
(Continued)

(56) References Cited

U.S. PATENT DOCUMENTS 5,645,706 A * 7/1997 Matsuda ................. C25D 21/06
205/82
5,885,373 A * 3/1999 Sienkowski ............ C23C 22/83
148/261
(Continued)

FOREIGN PATENT DOCUMENTS

JP 7-41913 A 2/1995
JP 7-166365 A 6/1995
(Continued)

*Primary Examiner* — Kevin R Kruer
(74) *Attorney, Agent, or Firm* — Birch, Stewart, Kolasch & Birch, LLP

(57) ABSTRACT

A non-oriented electrical steel sheet according to an embodiment of the present invention is a non-oriented electrical steel sheet including a base metal steel sheet and a composite coating film that is formed on surfaces of the base metal steel sheet and includes Zn-containing phosphate and an organic resin, wherein the non-oriented electrical steel sheet contains crystalline aluminum phosphate showing diffraction lines belonging to ICDD No. 01-074-3256 when the composite coating film is measured by a wide-angle X-ray diffraction method.

8 Claims, 1 Drawing Sheet

(51) Int. Cl.
  *B32B 15/18* (2006.01)
  *C23C 22/03* (2006.01)
  *C23C 22/82* (2006.01)
(52) U.S. Cl.
  CPC .......... *C23C 22/82* (2013.01); *B32B 2255/06* (2013.01); *B32B 2255/26* (2013.01); *B32B 2307/206* (2013.01); *B32B 2307/704* (2013.01); *B32B 2307/714* (2013.01); *B32B 2307/748* (2013.01)
(58) Field of Classification Search
  CPC ........ B32B 2307/206; B32B 2307/704; C23C 22/03; C23C 22/82
  See application file for complete search history.

(56) References Cited

U.S. PATENT DOCUMENTS

| | | | |
|---|---|---|---|
| 5,945,212 A | 8/1999 | Tanaka et al. | |
| 2003/0072962 A1* | 4/2003 | Matsuzaki | C23C 28/322 428/653 |
| 2010/0272991 A1* | 10/2010 | Park | C09D 7/70 252/503 |
| 2011/0039120 A1 | 2/2011 | Fujii et al. | |
| 2013/0203896 A1* | 8/2013 | Xu | C09D 7/48 523/451 |
| 2015/0072166 A1* | 3/2015 | Nakano | C23C 8/00 428/629 |
| 2015/0083276 A1* | 3/2015 | Nakano | C23C 2/261 148/284 |
| 2015/0107722 A1* | 4/2015 | Nakano | C23C 2/06 148/284 |
| 2016/0060465 A1* | 3/2016 | Sundermeier | C23C 22/20 106/14.12 |
| 2016/0102414 A1* | 4/2016 | Tani | C25D 5/36 205/152 |
| 2016/0322138 A1* | 11/2016 | Han | C01B 35/143 |
| 2017/0137633 A1* | 5/2017 | Terashima | C23C 30/00 |
| 2017/0342569 A1* | 11/2017 | Takahashi | C23C 22/74 |
| 2018/0033529 A1* | 2/2018 | Takeda | H01F 3/00 |
| 2018/0155840 A1* | 6/2018 | Yamazaki | C23C 22/47 |
| 2019/0226093 A1* | 7/2019 | Terashima | C23C 22/188 |
| 2019/0264334 A1* | 8/2019 | Cho | C23C 28/345 |
| 2020/0123632 A1* | 4/2020 | Takatani | C21D 6/001 |
| 2021/0071047 A1* | 3/2021 | Kim | B32B 37/12 |
| 2022/0042136 A1* | 2/2022 | Arai | C21D 8/1283 |
| 2022/0336129 A1* | 10/2022 | Takeda | C09D 7/61 |
| 2022/0341043 A1* | 10/2022 | Takeda | C23C 22/20 |

FOREIGN PATENT DOCUMENTS

| | | |
|---|---|---|
| JP | 11-80971 A | 3/1999 |
| JP | 11-131250 A | 5/1999 |
| JP | 2001-129455 A | 5/2001 |
| JP | 2002-69657 A | 3/2002 |
| WO | WO 2009/154139 A1 | 12/2009 |
| WO | WO 2021/054451 A1 | 3/2021 |

\* cited by examiner

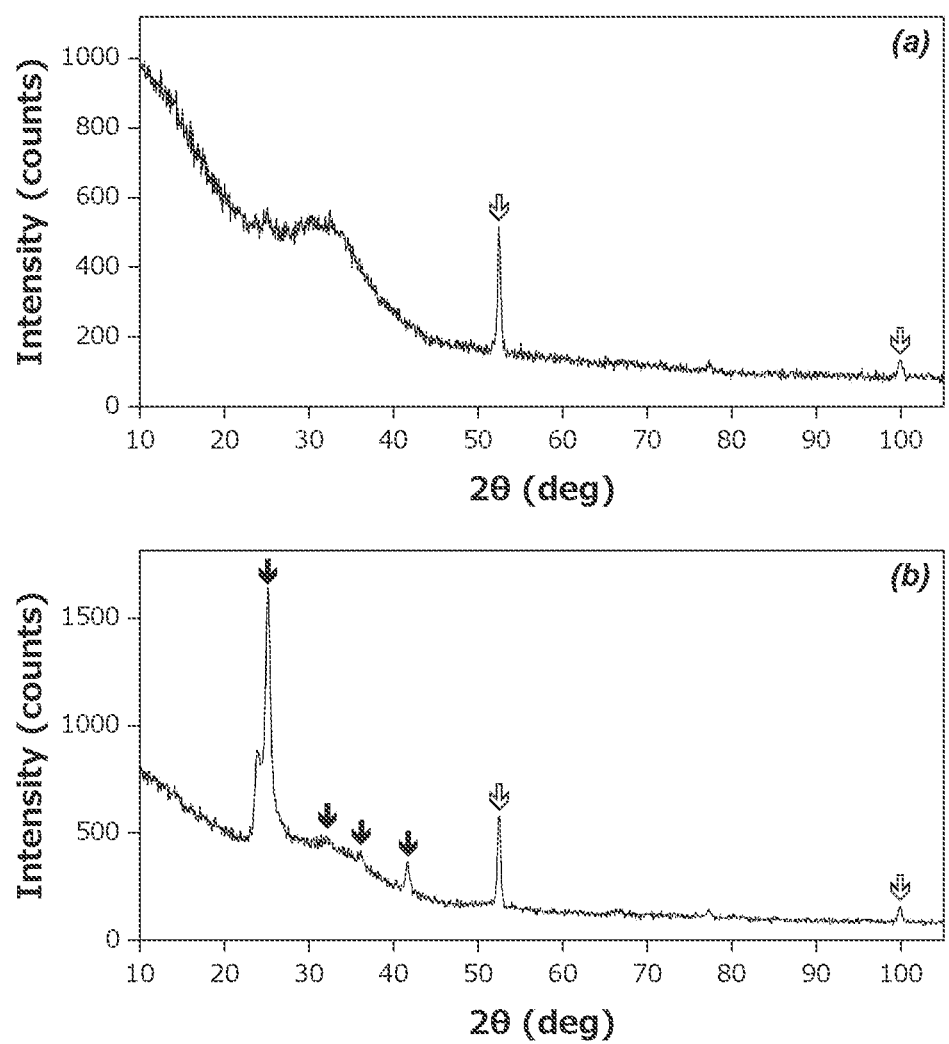

NON-ORIENTED ELECTRICAL STEEL SHEET AND METHOD FOR PRODUCING SAME

TECHNICAL FIELD

The present invention relates to a non-oriented electrical steel sheet, and a method for producing the non-oriented electrical steel sheet.

BACKGROUND ART

Non-oriented electrical steel sheets are used in the form of what is called a lamination that is formed by laminating a large number of steel sheets, as iron core materials for a rotary machine. When non-oriented electrical steel sheets are used as an iron core for a rotary machine, the efficiency of the rotary machine may decrease if a current referred to as "eddy current" is induced in the normal direction of a surface of the laminated steel sheets. Therefore, it is a common practice to form insulating coating films on surfaces of non-oriented electrical steel sheets in order to prevent the production of eddy current.

In addition to preventing the production of eddy current, the insulating coating film also has a function of protecting a non-oriented electrical steel sheet itself, which is constituted by elements composed mainly of iron, from rusting, that is, against corrosion. Therefore, it has been common to form a chromate-based coating film, which has a strong corrosion-preventing action, on surfaces of non-oriented electrical steel sheets.

However, in recent years, with the increase in environmental consciousness, a large number of kinds of insulating coating films for which no chromate compound is used have been proposed. For one of the insulating coating films, a technique in which "Zn" is used as one of metallic components in a coating solution serving as a material of the insulating coating film has been proposed.

For example, Patent Document 1 discloses that a coating film agent containing one or two or more of Al phosphate, Ca phosphate, and Zn phosphate are used as an inorganic substance. Patent Document 2 discloses that an $Al_2O_3/H_3PO_4$ molar ratio, a $CaO/H_3PO_4$ molar ratio and a $ZnO/H_3PO_4$ molar ratio are defined with respect to Al phosphate, Ca phosphate and Zn phosphate, respectively, which are used as inorganic compounds in a coating.

In addition, Patent Document 3 discloses the use of monoaluminum phosphate and organic acid salts of Al, Mg, Ca and Zn. Further, Patent Documents 4 to 6 disclose the use of a metal phosphate containing a Zn component. If an insulating coating film is formed on a non-oriented electrical steel sheet with the application of the technique using "Zn", a corrosion resistance to a certain extent can be ensured.

In recent years, there has been increased cases in which non-oriented electrical steel sheets are transported to a high-temperature and high-humidity region such as the Southeast Asian countries, and subjected to working in the region. When non-oriented electrical steel sheets are transported to the regions, a large vessel is used, and the transporting vessel may cross the equator. Therefore, the non-oriented electrical steel sheets are exposed to a high temperature and high-humidity environment for a long time in both the transportation and a factory for the working.

In addition, a non-oriented electrical steel sheet is coiled into a coil shape and stored in a state where an axial direction of the coil is level. Therefore, a high interfacial pressure is applied between coating film surfaces of the non-oriented electrical steel sheet under a self-weight of the coil.

For that reason, in the case where a high interfacial pressure is applied between coating film surfaces for a long time under a high-temperature and high-humidity environment, there is a concern about a problem what is called blocking, in which coating film surfaces adhere to each other under an effect of water that enters between steel sheets.

As a technique to prevent a blocking effect between coating film surfaces, Patent Document 7 proposes a technique of mixing an oxide powder having a large surface area into a coating solution for forming a coating film.

LIST OF PRIOR ART DOCUMENTS

Patent Document

Patent Document 1: JP07-041913A
Patent Document 2: JP07-166365A
Patent Document 3: JP11-131250A
Patent Document 4: JP11-080971A
Patent Document 5: JP2001-129455A
Patent Document 6: JP2002-069657A
Patent Document 7: WO 2009/154139

SUMMARY OF INVENTION

Technical Problem

According to the invention described in Patent Document 7, a non-oriented electrical steel sheet that exerts excellent anti-blocking properties even when stored for a week under a harsh environment is provided. However, in Patent Document 7, aluminum biphosphate is adopted, and Patent Document 7 has no sufficient studies on a blocking effect between coating film surfaces containing Zn-containing phosphate. In addition, there has recently been a demand for a non-oriented electrical steel sheet that is capable of preventing the blocking effect between coating film surfaces even in such a long-period storage that lasts two months under a harsh environment.

The present invention is to solve the problems described above, and an objective thereof is to provide a non-oriented electrical steel sheet that includes a coating film having excellent corrosion resistance brought by a Zn component in place of a chromate compound, which is an environmentally hazardous substance, and that is excellent in anti-blocking properties between coating film surfaces and provide a method for producing the non-oriented electrical steel sheet.

Solution to Problem

The present invention has been made to solve the problems described above, and the gist of the present invention is a non-oriented electrical steel sheet and a method for producing the non-oriented electrical steel sheet described below.

(1) A non-oriented electrical steel sheet according to an embodiment of the present invention is a non-oriented electrical steel sheet including a base metal steel sheet and a composite coating film that is formed on surfaces of the base metal steel sheet and includes Zn-containing phosphate and an organic resin, wherein the non-oriented electrical steel sheet contains crystalline aluminum phosphate showing diffraction lines belonging to ICDD No. 01-074-3256 when the composite coating film is measured by a wide-angle X-ray diffraction method.

(2) In the non-oriented electrical steel sheet according to (1) above, when a plurality of the non-oriented electrical steel sheets are laminated with a contact area of 9 cm$^2$ and are pressed with an interfacial pressure being 40 kgf/cm$^2$ and after the non-oriented electrical steel sheets are retained in an atmosphere at a temperature of 50° C. and a humidity of 90% for 56 days, a vertical peel-off force measured at room temperature is 1000 g or less.

(3) In the non-oriented electrical steel sheet according to (1) or (2) above, the composite coating film may further contain one or more elements selected from the group consisting of Mg and Ca.

(4) In the non-oriented electrical steel sheet according to any one of (1) to (3) above, the organic resin may include one or more resins selected from the group consisting of an acrylic resin, a styrene resin, an acrylic-styrene resin, an epoxy resin, a polyester resin, a phenolic resin, and a urethane resin.

(5) A method for producing a non-oriented electrical steel sheet according to another embodiment of the present invention includes: a step of applying a coating solution to a surface of a base metal steel sheet, the coating solution containing Zn-containing phosphate, an organic resin, and $\delta$-Al$_2$O$_3$; and a step of forming a composite coating film by baking the coating solution in an atmosphere having an air ratio of 1.8 or less with a maximum end-point temperature within a range of 250 to 450° C.

(6) In the method for producing a non-oriented electrical steel sheet according to (5) above, the coating solution further contains, as a metallic component of the Zn-containing phosphate, one or more elements selected from the group consisting of Al, Mg and Ca.

(7) In the method for producing a non-oriented electrical steel sheet according to (5) or (6) above, the organic resin may include one or more resins selected from the group consisting of an acrylic resin, a styrene resin, an acrylic-styrene resin, an epoxy resin, a polyester resin, a phenolic resin, and a urethane resin.

Advantageous Effects of Invention

According to the present invention, a non-oriented electrical steel sheet that includes a coating film having excellent corrosion resistance brought by a Zn component in place of a chromate compound, which is an environmentally hazardous substance, and that is excellent in anti-blocking properties between coating film surfaces can be provided.

BRIEF DESCRIPTION OF DRAWING

FIG. 1 is a diagram illustrating a wide-angle X-ray diffraction chart.

DESCRIPTION OF EMBODIMENTS

The present inventors conducted diligent studies about a method for improving anti-blocking properties of a coating film surface containing Zn-containing phosphate and consequently obtained the following findings.

When a coating solution containing phosphate is baked on a steel sheet, phosphorus acids undergo a dehydration condensation reaction to form a reticulated network, forming a coating film. In this event, some of the phosphorus acids combine with coexisting metallic components such as zinc. At this time, a phosphorus acid that neither forms the network nor combines with the metallic components, what is called free phosphorus acid is generated.

Free phosphorus acid has a high reactivity with water and thus easily reacts with water when exposed to a high-temperature and high-humidity environment, thus serving as a cause of blocking. The present inventors tried the immobilization of free phosphorus acid by adding oxide powder having a large specific surface area to Zn-containing phosphate, based on the findings obtained from Patent Document 7. However, as a result of conducting various experiments, the present inventors have found that even oxide powders having equivalent specific surface areas cause variations in anti-blocking properties.

The present inventors thus investigated a cause of variations in anti-blocking properties with attention paid to aluminas (Al$_2$O$_3$), which are oxides relatively easily available.

As a result, the present inventors have found that anti-blocking properties are significantly affected by kinds of Al$_2$O$_3$ to be added to a coating solution for forming a coating film and an atmosphere in baking. By appropriately selecting Al$_2$O$_3$ based on its kind rather than its specific surface area, free phosphorus acid can be immobilized efficiently in the form of crystalline aluminum phosphate. In addition, by controlling an air ratio in a baking atmosphere, it becomes possible to provide non-oriented electrical steel sheets having excellent anti-blocking properties stably.

The present invention has been made based on the above findings. Requirements of the present invention will be described below.

1. Non-Oriented Electrical Steel Sheet

A non-oriented electrical steel sheet according to the present embodiment includes a base metal steel sheet, and a composite coating film that is formed on a surface of the base metal steel sheet. In general, insulating coating films of non-oriented electrical steel sheets are roughly classified into the following three kinds: purely organic coating film (coating film entirely composed of organic substances); inorganic coating film (coating film entirely composed of inorganic substances); and composite coating film (coating film composed of a combination of organic substances and inorganic substances and also called a "semi-organic coating film"). The insulating coating film of the non-oriented electrical steel sheet according to the present embodiment is a composite coating film.

The non-oriented electrical steel sheet according to the present embodiment has excellent anti-blocking properties. In the present invention, anti-blocking properties are to be evaluated by the following method. First, a plurality of non-oriented electrical steel sheets are laminated with a contact area of 9 cm$^2$ and are pressed with an interfacial pressure being 40 kgf/cm$^2$. Subsequently, the non-oriented electrical steel sheets are retained in an atmosphere at a temperature of 50° C. and a humidity of 90% for 56 days (8 weeks).

As described above, the blocking effect is likely to occur between coating film surfaces both containing Zn-containing phosphate in a long-period storage, particularly such one that lasts two months. For this reason, in the present invention, a retention duration under a high-temperature and high-humidity environment was set to 56 days.

Thereafter, a vertical peel-off force that is produced to separate the plurality of non-oriented electrical steel sheets in a vertical direction at room temperature is measured. For the non-oriented electrical steel sheet according to the present embodiment, the vertical peel-off force measured by the method described above is 1000 g or less. The vertical peel-off force is preferably 800 g or less, and more preferably 500 g or less.

2. Composite Coating Film

In the non-oriented electrical steel sheet according to the present embodiment, its composite coating film contains a phosphate as an inorganic substance. The present invention is based on such a technical idea that corrosion resistance is improved by dissolving a Zn component, and thus Zn-containing phosphate is essential. In other words, in the present invention, the composite coating film contains Zn-containing phosphate and an organic resin.

There are no specific restrictions on a molar ratio of Zn to all metallic components in the composite coating film. However, to sufficiently provide the effect of improving the corrosion resistance by dissolving a Zn component, the molar ratio of Zn to all metallic components is preferably 10 mol % or more, more preferably 20 mol % or more, and further preferably 30 mol % or more.

In addition, as described above, free phosphorus acid causes blocking between coating film surfaces. Therefore, free phosphorus acid is to be immobilized in the form of crystalline aluminum phosphate. For this purpose, the non-oriented electrical steel sheet according to the present embodiment contains crystalline aluminum phosphate showing diffraction lines belonging to ICDD No. 01-074-3256 when its composite coating film is measured by a wide-angle X-ray diffraction method.

FIG. 1 illustrates graphs illustrating wide-angle X-ray diffraction charts (X-ray source: CoKα) of measurement of (a) a composite coating film formed with a coating solution not containing $\delta$-$Al_2O_3$ and (b) a composite coating film formed with a coating solution containing $\delta$-$Al_2O_3$. The peaks indicated with black arrows in FIG. 1(b) show the diffraction line belonging to ICDD No. 01-074-3256. In contrast, the peaks indicated with white arrows in FIGS. 1(a) and (b) are attributable to iron in the steel sheet as a substrate. These things show that free phosphorus acid is immobilized in the form of crystalline aluminum phosphate only when $\delta$-$Al_2O_3$ is added to the coating solution. Note that the measurement by the wide-angle X-ray diffraction method is to be performed by a thin-film method, which makes it easy to provide diffraction lines attributable to the coating film components.

In the analysis, when a peak intensity from which a background intensity is subtracted is twice or more a noise width, it is determined that there is a peak, and when three or more diffraction lines belonging to crystalline aluminum phosphate are identified, it is determined that crystalline aluminum phosphate is contained.

As described above, the composite coating film formed on surfaces of the base metal steel sheet contains Zn and Al as metallic components. Zn is derived from Zn-containing phosphate in principle but may be derived from another component. Further, Al may be contained as crystalline aluminum phosphate as well as amorphous aluminum phosphate and $Al_2O_3$.

Examples of elements that constitute the balance of the metallic components can include, but not limited to, one or more elements selected from the group consisting of Mg and Ca. Note that, with consideration given to environmental loads, it is not preferable that the composite coating film contain a chromate compound or a substance derived therefrom. A content of the chromate compound and a substance derived therefrom should be minimized so as to meet environmental standards, and preferably the content is 0% by mass.

There are no specific restrictions on a thickness of the composite coating film of the non-oriented electrical steel sheet according to the present embodiment, the thickness only has to be a normal thickness that is applied to the insulating coating film for the non-oriented electrical steel sheet. However, the thicker the composite coating film, the more the problem of the blocking effect is likely to become apparent. In addition, from the viewpoint of preventing the production of eddy current, a normal thickness of the composite coating film of the non-oriented electrical steel sheet is preferably, for example, 0.2 μm or more, 0.3 μm or more, or 0.5 μm or more.

There are no specific restrictions on a kind of the organic resin, and an organic resin known as an organic resin that constitutes the insulating coating film of the non-oriented electrical steel sheet may be used. Examples of the organic resin include one or more resins selected from the group consisting of an acrylic resin, a styrene resin, an acrylic-styrene resin, an epoxy resin, a polyester resin, a phenolic resin, and a urethane resin.

3. Base Metal Steel Sheet

The base metal steel sheet of the non-oriented electrical steel sheet according to the present embodiment is not particularly limited. This is because the enhancement of corrosion resistance, which is one of the subjects for the non-oriented electrical steel sheet according to the present embodiment, is achieved by making the insulating coating film contain Zn. The base metal steel sheet can be appropriately selected from among steel sheets that are usually used as base metal steel sheets of non-oriented electrical steel sheets.

4. Production Method

The non-oriented electrical steel sheet according to the present embodiment can be produced by a production method that includes a step of applying a coating solution to surfaces of the base metal steel sheet and a step of thereafter forming a composite coating film on the base metal steel sheet by baking the coating solution.

4-1. Coating Solution

The coating solution to be applied to the surface of the base metal steel sheet contains an aqueous phosphate solution, an aqueous dispersion of organic resin, and $\delta$-$Al_2O_3$. Further, the aqueous phosphate solution is made to contain a Zn component as one of its metallic components. Examples of metallic components other than Zn that are present in the form of their phosphates include, but not limited to, Al, Mg, Ca, and the like with consideration given to prices, availabilities, and the like of raw materials of the metallic components, and the like.

There are no specific restrictions on the kind of the organic resin. Any kind of organic resin can be used as long as the resin does not form coarse agglomerates when mixed with the aqueous phosphate solution. Organic resins preferable as the organic resin include one or more kinds selected from the group consisting of an acrylic resin, a styrene resin, an acrylic-styrene resin, an epoxy resin, a polyester resin, a phenolic resin, a urethane resin, and the like.

Any ratio between the aqueous phosphate solution and the aqueous dispersion of organic resin can be selected. A non-oriented electrical steel sheet on which an insulating coating film is formed with a coating solution not containing an aqueous dispersion of organic resin tends to be poor in punchability. Therefore, an aqueous dispersion of organic resin should be contained in the coating solution. A compounding ratio of the aqueous phosphate solution and the aqueous dispersion of organic resin is to be determined with consideration given to their solid content concentrations.

For example, a ratio of a solid content of the organic resin to a solid content of the phosphate being 3 mass % or more is preferable because a punchability of a non-oriented electrical steel sheet provided as a final product is further enhanced at the ratio. On the other hand, a ratio of the solid content of the organic resin to the solid content of the phosphate being 25 mass % or less is preferable because a row material cost can be kept low at the ratio. Therefore, the ratio of the solid content of the organic resin to the solid content of the phosphate may be specified to be 3 to 25 mass %. When a wettability of the steel sheet raises a problem, a surfactant may be additionally added to the coating solution.

Note that, from the viewpoint of reduction of environmental loads, it is not preferable to make the mixed solution contain a chromate compound.

In addition, in the present invention, the coating solution contains $\delta$-$Al_2O_3$ to immobilize free phosphorus acid, thus enhancing anti-blocking properties. As described above, to immobilize free phosphorus acid efficiently, the kind of $Al_2O_3$ is important. $Al_2O_3$ includes $\alpha$-$Al_2O_3$, $\gamma$-$Al_2O_3$, $\delta$-$Al_2O_3$, and $\theta$-$Al_2O_3$. In general, $\alpha$-$Al_2O_3$, which is the most inexpensive, is used. However, as a result of studies, the present inventors have found that different kinds of $Al_2O_3$ have different capabilities of immobilizing free phosphorus acid, and $\delta$-$Al_2O_3$, which is less used because of its expensiveness compared with $\alpha$-$Al_2O_3$, is most excellent in immobilizing capability.

$\alpha$-$Al_2O_3$ is obtained by, for example, baking at a relatively high temperature and has a structure of strong binding. For this reason, $\alpha$-$Al_2O_3$ is considered to be poor in reactivity with phosphorus acid, thus failing to immobilize free phosphorus acid efficiently. Thus, a non-oriented electrical steel sheet that is produced with $\alpha$-$Al_2O_3$ added to its coating solution cannot exert excellent anti-blocking properties.

In contrast, $\delta$-$Al_2O_3$ is obtained by baking at a relatively low temperature and has a structure of loose binding. Having a loose structure, $\delta$-$Al_2O_3$ is conjectured to be high in reactivity with phosphorus acid, thus being capable of efficiently immobilizing free phosphorus acid produced by a dehydration condensation reaction of phosphorus acid. Then, $\delta$-$Al_2O_3$ combines with free phosphorus acid to form crystalline aluminum phosphate.

There are no specific restrictions on an amount of $\delta$-$Al_2O_3$ added to the coating solution. However, the amount is preferably 0.1 g or more, and more preferably 0.5 g or more. However, to bring the vertical peel-off force measured by the method described above to 800 g or less, the additive amount of $\delta$-$Al_2O_3$ is preferably set to 1.0 g or more for 100 g of phosphate, and to bring the vertical peel-off force to 500 g or less, the additive amount is preferably set to 2.0 g or more. In contrast, an excessive addition of $\delta$-$Al_2O_3$ results in the saturation of the effect, the additive amount of $\delta$-$Al_2O_3$ is preferably set to 40 g or less for 100 g of phosphate, and more preferably set to 30 g or less.

There are no specific restrictions on a particle diameter of $\delta$-$Al_2O_3$ added to the coating solution. However, if the particle diameter is more than 10 μm, a stacking factor of $\delta$-$Al_2O_3$ in the non-oriented electrical steel sheet decreases, which in turn may degrade magnetic properties of the non-oriented electrical steel sheet as a laminated core. For this reason, the particle diameter is preferably 10 μm or less.

In addition, the smaller the particle diameter of $\delta$-$Al_2O_3$, the more the immobilizing capability of the free phosphorus acid tends to be enhanced. To bring the vertical peel-off force measured by the method described above to 800 g or less, the particle diameter is preferably 0.5 μm or less, and to bring the vertical peel-off force to 500 g or less, the particle diameter is preferably less than 0.05 μm.

The particle diameter of $\delta$-$Al_2O_3$ is to be measured by the "laser diffraction/scattering method", which is the most commonly used in the measurement of particle diameters of inorganic substance particles. From the measurement by the technique, the particle diameter can be determined as a particle diameter at 50% point in a cumulative distribution. Note that, in the case of $\delta$-$Al_2O_3$ having a particle diameter of 50 nm or less, it is necessary to take care to ensure the accuracy of the analysis by adopting a particle diameter measurement method suitable for measuring smaller particle diameters such as a "dynamic light scattering method" in combination.

In addition, $\delta$-$Al_2O_3$ may absorb water in the air, and part of the $\delta$-$Al_2O_3$ may be changed into aluminum hydroxide ($Al(OH)_3$). The change of part of $\delta$-$Al_2O_3$ into $Al(OH)_3$, does not necessarily spoil the immobilizing capability of free phosphorus acid but slightly decreases the immobilizing capability. For that reason, in the coating solution, a proportion of Al in the form of $Al(OH)_3$ to a total amount of Al added in the form of $\delta$-$Al_2O_3$ and Al in the form of $Al(OH)_3$ produced by hydration reaction is preferably 30% or less, more preferably 20% or less, and further preferably 10% or less in terms of molar ratio.

In the case where $\delta$-$Al_2O_3$ has particle diameters being more than 1 μm, the agglomeration of its particles is unlikely to occur, and the $\delta$-$Al_2O_3$ may be added directly to the coating solution. On the other hand, in the case where $\delta$-$Al_2O_3$ has particle diameters being 1 μm or less, the $\delta$-$Al_2O_3$ should be dispersed in water to be prepared in a state of its aqueous dispersion before being added to the coating solution. When the $\delta$-$Al_2O_3$ is dispersed in water, a solid content of the $\delta$-$Al_2O_3$ is to be adjusted.

4-2. Baking Conditions

As described above, when the prepared coating solution is baked, it is important to control an atmosphere for the baking. As a result of research, the present inventors have found that, even when free phosphorus acid was successfully immobilized with $\delta$-$Al_2O_3$, the blocking effect occurred in some cases in the case where a surface texture of a coating film formed by the baking degraded. The present inventors have further found that the surface texture of the coating film is significantly affected by an air ratio in the baking atmosphere.

The baking of the coating solution is typically performed in a continuous line. For the baking, a radiant furnace or an air-heating furnace is often used. However, in the present invention, a direct fired burner is adopted in at least part of the continuous line. A direct fired burner is introduced into a heat treatment facility after being brought into a flaming state by igniting fuel mixed into air at a certain ratio. A non-oriented electrical steel sheet with the coating solution applied to its surfaces is made to pass through the direct fired burner to cause water to evaporate and increase its temperature, thus baking a coating film on the steel sheet. In the same continuous line, an indirect fired burner may be used in combination.

If the air ratio in the baking atmosphere is too high, an organic resin component in the coating film is burned to cause swellings or bursts, forming the surface of the coating film into a shape with a severe unevenness. In other words, the severe unevenness of the surface means a large surface area. As a result, when the non-oriented electrical steel sheet is exposed to a humidified atmosphere, the resultant non-oriented electrical steel sheets come into contact with many water molecules, thus tending to be sticky. In the case where a high interfacial pressure is then applied between coating film surfaces of the non-oriented electrical steel sheets for a long time, the blocking occurs.

In contrast, if the air ratio is too low, unburned soot and dust of carbon are produced in flames, degrading the appearance of the coating film. For this reason, the air ratio in the baking atmosphere is set to 1.1 to 1.8. The air ratio is preferably set to 1.7 or less, and more preferably 1.6 or less.

Note that an air ratio m in the present invention is calculated based on the following formula from a theoretical amount A of air and an actual amount A0 of air in the direct fired burner, not from a concentration of oxygen in the atmosphere.

$$m=A/A0$$

In addition, if a maximum end-point temperature in the baking is too low, the baking becomes insufficient, causing stickiness. On the other hand, if the maximum end-point temperature is too high, it is difficult to prevent the formation of an oxidized layer, and a corrosion resistance of a cut surface of the resultant non-oriented electrical steel sheet is degraded. For this reason, the maximum end-point temperature in the baking is set within the range of 250 to 450° C.

There are no specific restrictions on a duration of baking the prepared coating solution. However, the duration is preferably set within the range of, for example, 5 to 120 seconds. If the duration of baking is shorter than 5 seconds, the insulating coating film may become sticky. On the other hand, if the duration of baking is longer than 120 seconds, the resin component in the insulating coating film disappears, which may degrade a punchability of the non-oriented electrical steel sheet. The duration of baking is more preferably set within the range of 10 to 60 seconds.

The present invention will be described below more specifically with reference to examples, but the present invention is not limited to these examples.

EXAMPLES (Example 1) Air Ratio

Annealed non-oriented electrical steel sheets that had a sheet thickness of 0.5 mm and on which no composite coating film was formed (that is, base metal steel sheets) were prepared. A mixed solution of 200 g of an aqueous phosphate solution having a solid content concentration of 50% in which a Zn molar ratio was adjusted to 20% with a mixture of Al phosphate and Zn phosphate (100 g of phosphate), 40 g of an aqueous dispersion of acrylic-styrene resin having a concentration of 40%, and 2.0 g of δ-$Al_2O_3$ powder having a particle diameter of 15 nm was applied to the base metal steel sheets. Subsequently, composite coating films were formed in the direct fired burner with the maximum end-point temperature set to 340° C. at various air ratios.

An amount of the composite coating films was set to be 1.5 $g/m^2$ per side. Further, the composite coating films were provided on both surfaces of each base metal steel sheet, and the amount and components of the composite coating films were set to be substantially the same on both sides.

Here, in Test No. 1-1, in which its air ratio was less than 1.1, unburned soot and dust of carbon were produced in flames, resulting in a degraded appearance of the coating film. For this reason, the steel sheet was not subjected to the subsequent measurement.

Subsequently, the composite coating films were subjected to measurement by the wide-angle X-ray diffraction method. For the measurement, RINT-2500H/PC from Rigaku Corporation was used, and CoKα (30 kV, 100 mA) was used as its X-ray source. As a result of the measurement, it was confirmed that all the non-oriented electrical steel sheets contained crystalline aluminum phosphate showing diffraction lines belonging to ICDD No. 01-074-3256.

Next, the non-oriented electrical steel sheets with the composite coating films were cut with a shearing machine into 30 mm×40 mm size, and cutting burrs produced in the cutting were removed. Thirteen of the non-oriented electrical steel sheets were laminated such that their long sides (40 mm) and short sides (30 mm) alternated. That is, the contact area was 9 $cm^2$. The resultant lamination was fixed in a state where the lamination was pressed with an interfacial pressure of 40 $kgf/cm^2$ (3.92 MPa).

Then, the lamination was placed together with a fixing device in a temperature and humidity controlled chamber with its temperature set to 50° C. and its humidity set to 90% for 8 weeks (56 days). After a lapse of 8 weeks, the lamination was taken from the temperature and humidity controlled chamber, and the non-oriented electrical steel sheets were peeled off in a vertical direction one by one from a topmost sample using a rubber sucker in a state of room temperature, by which a peel-off force was measured 12 times. Then, a maximum value and a minimum value of the 12 peel-off forces were discarded, and an average value of the remaining 10 peel-off forces was calculated as a "vertical peel-off force". Qualities in the anti-blocking properties were classified in levels as follows. Cases rated as A or B were taken as being good.

(Criteria for Evaluating Anti-Blocking Properties)

Cases where the vertical peel-off force was 500 g or less: A

Cases where the vertical peel-off force was more than 500 g to 1000 g or less: B Cases where the vertical peel-off force was more than 1000 g to 1500 g or less: C Cases where the vertical peel-off force was more than 1500 g: D Results of the above are shown in Table 1.

[Table 1]

TABLE 1

| Test No. | Air ratio | Crystalline phosphate | Anti-blocking property | | |
|---|---|---|---|---|---|
| | | | Vertical peel-off force (g) | Judgment | |
| 1-1 | 1.0 | Present | — | | Comparative example |
| 1-2 | 1.1 | Present | 250 | A | Inventive example |
| 1-3 | 1.2 | Present | 150 | A | Inventive example |
| 1-4 | 1.3 | Present | 200 | A | Inventive example |
| 1-5 | 1.4 | Present | 250 | A | Inventive example |
| 1-6 | 1.5 | Present | 150 | A | Inventive example |
| 1-7 | 1.6 | Present | 250 | A | Inventive example |
| 1-8 | 1.7 | Present | 350 | A | Inventive example |
| 1-9 | 1.8 | Present | 750 | B | Inventive example |
| 1-10 | 1.9 | Present | 1250 | C | Comparative example |
| 1-11 | 2.0 | Present | 1900 | D | Comparative example |

Table 1 shows that the anti-blocking properties were favorable when the air ratio in the baking atmosphere is within the range of 1.8 or less.

(Example 2) δ-Al$_2$O$_3$

Annealed non-oriented electrical steel sheets that had a sheet thickness of 0.5 mm and on which no composite coating film was formed (that is, base metal steel sheets) were prepared. Mixed solutions of 200 g of an aqueous phosphate solution having a solid content concentration of 50% in which a Zn molar ratio was adjusted to 20% with a mixture of Al phosphate and Zn phosphate (100 g of phosphate), 20 g of an aqueous dispersion of acrylic-styrene resin having a concentration of 40%, and α-Al$_2$O$_3$ powder having a particle diameter of 100 nm or δ-Al$_2$O$_3$ powder having a particle diameter of 10 nm in additive amounts shown in Table 2 were applied to the base metal steel sheets. Note that no Al$_2$O$_3$ powders were added in Test No. 2-1 shown in Table 2. Subsequently, composite coating films were formed in the direct fired burner with the maximum end-point temperature set to 340° C. at an air ratio of 1.5.

An amount of the composite coating films was set to be 2.5 g/m$^2$ per side. Further, the composite coating films were provided on both surfaces of each base metal steel sheet, and the amount and components of the composite coating films were set to be substantially the same on both sides.

Subsequently, the composite coating films were subjected to measurement by the wide-angle X-ray diffraction method as in Example 1. As a result, in Test Nos. 2-1 and 2-2, no diffraction lines belonging to ICDD No. 01-074-3256 were observed. In contrast, in Test Nos. 2-3 to 2 to 9, it was confirmed that their non-oriented electrical steel sheets contained crystalline aluminum phosphate showing diffraction lines belonging to ICDD No. 01-074-3256.

Subsequently, measurement and evaluation of the vertical peel-off force were conducted with the same criteria as in Example 1. Results of the measurement and evaluation are shown in Table 2.

TABLE 2

| | Al$_2$O$_3$ | | Anti-blocking property | | |
|---|---|---|---|---|---|
| Test No. | Kind | Additive amount (g) | Crystalline Al phosphate | Vertical peel-off force (g) | Judgment |
| 2-1 | — | — | absent | 1800 | D | Comparative example |
| 2-2 | α | 10 | absent | 1700 | D | Comparative example |
| 2-3 | δ | 0.1 | Present | 900 | B | Inventive example |
| 2-4 | δ | 1.0 | Present | 600 | B | Inventive example |
| 2-5 | δ | 2.0 | Present | 200 | A | Inventive example |
| 2-6 | δ | 10 | Present | 150 | A | Inventive example |
| 2-7 | δ | 20 | Present | 100 | A | Inventive example |
| 2-8 | δ | 30 | Present | 150 | A | Inventive example |
| 2-9 | δ | 40 | Present | 100 | A | Inventive example |

Table 2 shows that the anti-blocking properties were favorable when the δ-Al$_2$O$_3$ was added to the coating solution.

(Example 3) Zn/Mg Phosphate

Annealed non-oriented electrical steel sheets that had a sheet thickness of 0.5 mm and on which no composite coating film was formed (that is, base metal steel sheets) were prepared. A mixed solution of 200 g of an aqueous phosphate solution having a solid content concentration of 50% in which a Zn molar ratio was adjusted to 40% with a mixture of Mg phosphate and Zn phosphate (100 g of phosphate), 20 g of an aqueous dispersion of acrylic-styrene resin having a concentration of 40%, and 30 g of δ-Al$_2$O$_3$ powder having a particle diameter of 20 nm was applied to the base metal steel sheets. Subsequently, composite coating films were formed in the direct fired burner with the maximum end-point temperature set to 340° C. at an air ratio of 1.5.

An amount of the composite coating films was set to be 1.5 g/m$^2$ per side. Further, the composite coating films were provided on both surfaces of each base metal steel sheet, and the amount and components of the composite coating films were set to be substantially the same on both sides.

Subsequently, the composite coating films were subjected to measurement by the wide-angle X-ray diffraction method as in Example 1. As a result, it was confirmed that crystalline aluminum phosphate showing diffraction lines belonging to ICDD No. 01-074-3256 was contained.

Subsequently, measurement and evaluation of the vertical peel-off force were conducted with the same criteria as in Example 1. Results are shown in Table 3.

[Table 3]

TABLE 3

| | | Anti-blocking property | | |
|---|---|---|---|---|
| Test No. | Crystalline Al phosphate | Vertical peel-off force (g) | Judgment | |
| 3-1 | Present | 250 | A | Inventive example |

Table 3 shows that, even when the metallic components of the phosphate were Zn/Mg-based, the anti-blocking properties were favorable when the δ-Al$_2$O$_3$ was added to the coating solution, and the baking conditions were appropriate.

(Example 4) Zn/Ca Phosphate

Annealed non-oriented electrical steel sheets that had a sheet thickness of 0.35 mm and on which no composite coating film was formed (that is, base metal steel sheets) were prepared. A mixed solution of 200 g of an aqueous phosphate solution having a solid content concentration of 50% in which a Zn molar ratio was adjusted to 30% with a mixture of Ca phosphate and Zn phosphate (100 g of phosphate), 10 g of an aqueous dispersion of acrylic-styrene resin having a concentration of 40%, and 20 g of δ-Al$_2$O$_3$ powder having a particle diameter of 40 nm was applied to the base metal steel sheets. Subsequently, composite coating films were formed in the direct fired burner with the maximum end-point temperature set to 340° C. at an air ratio of 1.2.

An amount of the composite coating films was set to be 1.0 g/m² per side. Further, the composite coating films were provided on both surfaces of each base metal steel sheet, and the amount and components of the composite coating films were set to be substantially the same on both sides.

Subsequently, the composite coating films were subjected to measurement by the wide-angle X-ray diffraction method as in Example 1. As a result, it was confirmed that crystalline aluminum phosphate showing diffraction lines belonging to ICDD No. 01-074-3256 was contained.

Subsequently, measurement and evaluation of the vertical peel-off force were conducted with the same criteria as in Example 1. Results are shown in Table 4.

TABLE 4

| Test No. | Anti-blocking property | | | |
|---|---|---|---|---|
| | Crystalline Al phosphate | Vertical peel-off force (g) | Judgment | |
| 4-1 | Present | 300 | A | Inventive example |

Table 4 shows that, even when the metallic components of the phosphate were Zn/Ca-based, the anti-blocking properties were favorable when the δ-Al₂O₃ was added to the coating solution, and the baking conditions were appropriate.

(Example 5) Organic Resin

Annealed non-oriented electrical steel sheets that had a sheet thickness of 0.5 mm and on which no composite coating film was formed (that is, base metal steel sheets) were prepared. Mixed solutions of 200 g of an aqueous phosphate solution having a solid content concentration of 50% in which a Zn molar ratio was adjusted to 40% with a mixture of Al phosphate and Zn phosphate (100 g of phosphate), 30 g of aqueous dispersions of various organic resins shown in Table 5 each having a concentration of 40%, and 10 g of δ-Al₂O₃ powder having a particle diameter of 15 nm were applied to the base metal steel sheets. Subsequently, composite coating films were formed in the direct fired burner with the maximum end-point temperature set to 340° C. at an air ratio of 1.5.

An amount of the composite coating films was set to be 2.0 g/m² per side. Further, the composite coating films were provided on both surfaces of each base metal steel sheet, and the amount and components of the composite coating films were set to be substantially the same on both sides.

Subsequently, the composite coating films were subjected to measurement by the wide-angle X-ray diffraction method as in Example 1. As a result, it was confirmed that all the non-oriented electrical steel sheets contained crystalline aluminum phosphate showing diffraction lines belonging to ICDD No. 01-074-3256.

Subsequently, measurement and evaluation of the vertical peel-off force were conducted with the same criteria as in Example 1. Results are shown in Table 5.

TABLE 5

| Test No. | Resin | Anti-blocking property | | | |
|---|---|---|---|---|---|
| | | Crystalline Al phosphate | Vertical peel-off force (g) | Judgment | |
| 5-1 | Acrylic resin | Present | 150 | A | Inventive example |
| 5-2 | Styrene resin | Present | 200 | A | Inventive example |
| 5-3 | Acrylic-styrene resin | Present | 100 | A | Inventive example |
| 5-4 | Epoxy resin | Present | 250 | A | Inventive example |
| 5-5 | Polyester resin | Present | 300 | A | Inventive example |
| 5-6 | Phenolic resin | Present | 200 | A | Inventive example |
| 5-7 | Urethane resin | Present | 250 | A | Inventive example |

Table 5 shows that, even when any of the organic resins was used, the anti-blocking properties were favorable when the δ-Al₂O₃ was added to the coating solution, and the baking conditions were appropriate.

(Example 6) Baking Temperature

Annealed non-oriented electrical steel sheets that had a sheet thickness of 0.5 mm and on which no composite coating film was formed (that is, base metal steel sheets) were prepared. A mixed solution of 200 g of an aqueous phosphate solution having a solid content concentration of 50% in which a Zn molar ratio was adjusted to 20% with a mixture of Al phosphate and Zn phosphate (100 g of phosphate), 20 g of an aqueous dispersion of acrylic-styrene resin having a concentration of 40%, and 20 g of δ-Al₂O₃ powder having a particle diameter of 30 nm was applied to the base metal steel sheets. Subsequently, composite coating films were formed in the direct fired burner at an air ratio of 1.5 with various maximum end-point temperatures shown in Table 6.

The amount of composite coating film was set to be 4.5 g/m² per side. Further, the composite coating films were provided on both surfaces of each base metal steel sheet, and the amount and components of the composite coating films were set to be substantially the same on both sides.

Here, a composite coating film of Test No. 6-1, which was fabricated under a condition of a maximum end-point temperature set to 200° C. was insufficiently baked onto its base metal steel sheet, thus becoming sticky. A composite coating film of Test No. 6-6, which was fabricated under a condition of a maximum end-point temperature set to 500° C. was peeled off. For these reasons, the steel sheets were not subjected to the subsequent measurement.

Subsequently, the composite coating films of the remaining steel sheets were subjected to measurement by the wide-angle X-ray diffraction method as in Example 1. As a result, it was confirmed that all the non-oriented electrical steel sheets contained crystalline aluminum phosphate showing diffraction lines belonging to ICDD No. 01-074-3256.

Subsequently, measurement and evaluation of the vertical peel-off force were conducted with the same criteria as in Example 1. Results are shown in Table 6.

[Table 6]

TABLE 6

| Test No. | Maximum end-point temperature (° C.) | Crystalline Al phosphate | Anti-blocking property | | |
|---|---|---|---|---|---|
| | | | Vertical peel-off force (g) | Judgment | |
| 6-1 | 200 | — | — | Not available | Comparative example |
| 6-2 | 250 | Present | 300 | A | Inventive example |
| 6-3 | 350 | Present | 100 | A | Inventive example |
| 6-4 | 400 | Present | 150 | A | Inventive example |
| 6-5 | 450 | Present | 150 | A | Inventive example |
| 6-6 | 500 | — | — | Not available | Comparative example |

Table 6 shows that the anti-blocking properties were favorable when the maximum end-point temperature was from 250° C. to 450° C.

INDUSTRIAL APPLICABILITY

According to the present invention, a non-oriented electrical steel sheet that includes a coating film having excellent corrosion resistance brought by a Zn component in place of a chromate compound, which is an environmentally hazardous substance, and that is excellent in anti-blocking properties between coating film surfaces, can be provided. Thus, the non-oriented electrical steel sheets according to the present invention can prevent the occurrence of the blocking effect between their coating film surfaces even when the non-oriented electrical steel sheets are stored in a state of being laminated together for a long time under a high-temperature and high-humidity environment.

The invention claimed is:

1. A non-oriented electrical steel sheet comprising:
   a base metal steel sheet; and
   a composite coating film including Zn-containing phosphate and an organic resin, the composite coating film being formed on a surface of the base metal steel sheet, wherein
   the non-oriented electrical steel sheet contains crystalline aluminum phosphate showing diffraction lines belonging to ICDD No. 01-074-3256 when the composite coating film is measured by a wide-angle X-ray diffraction method, and
   when a plurality of the non-oriented electrical steel sheets are laminated with a contact area of 9 cm? and are pressed with an interfacial pressure being 40 kgf/cm$^2$ and after the non-oriented electrical steel sheets are retained in an atmosphere at a temperature of 50° C. and a humidity of 90% for 56 days, a vertical peel-off force measured at room temperature is 1000 g or less.

2. The non-oriented electrical steel sheet according to claim 1, wherein the composite coating film further contains one or more elements selected from the group of Mg and Ca.

3. The non-oriented electrical steel sheet according to claim 2, wherein the organic resin includes one or more resins selected from the group of an acrylic resin, a styrene resin, an acrylic-styrene resin, an epoxy resin, a polyester resin, a phenolic resin, and a urethane resin.

4. The non-oriented electrical steel sheet according to claim 1, wherein the organic resin includes one or more resins selected from the group of an acrylic resin, a styrene resin, an acrylic-styrene resin, an epoxy resin, a polyester resin, a phenolic resin, and a urethane resin.

5. A method for producing a non-oriented electrical steel sheet according to claim 1, the method comprising:
   a step of applying a coating solution to a surface of a base metal steel sheet, the coating solution containing Zn-containing phosphate, an organic resin, and δ-Al$_2$O$_3$; and
   a step of forming a composite coating film by baking the coating solution in an atmosphere having an air ratio of 1.8 or less with a maximum end-point temperature within a range of 250 to 450° C.

6. The method for producing a non-oriented electrical steel sheet according to claim 5, wherein the organic resin includes one or more resins selected from the group of an acrylic resin, a styrene resin, an acrylic-styrene resin, an epoxy resin, a polyester resin, a phenolic resin, and a urethane resin.

7. The method for producing a non-oriented electrical steel sheet according to claim 5, wherein the coating solution further contains one or more elements selected from the group of Al, Mg and Ca.

8. The method for producing a non-oriented electrical steel sheet according to claim 7, wherein the organic resin includes one or more resins selected from the group of an acrylic resin, a styrene resin, an acrylic-styrene resin, an epoxy resin, a polyester resin, a phenolic resin, and a urethane resin.

* * * * *

UNITED STATES PATENT AND TRADEMARK OFFICE
CERTIFICATE OF CORRECTION

PATENT NO.        : 11,948,710 B2
APPLICATION NO.   : 18/271622
DATED             : April 2, 2024
INVENTOR(S)       : Hiroyasu Fujii et al.

Page 1 of 1

It is certified that error appears in the above-identified patent and that said Letters Patent is hereby corrected as shown below:

In the Claims

Column 15; Line 47; Claim 1:
"are laminated with a contact area of 9 cm? and are"
Should read:
--are laminated with a contact area of 9 $cm^2$ and are--

Signed and Sealed this
Ninth Day of July, 2024

Katherine Kelly Vidal
*Director of the United States Patent and Trademark Office*